(12) United States Patent  
Slocum et al.

(10) Patent No.: US 11,738,849 B1
(45) Date of Patent: Aug. 29, 2023

(54) INFLATABLE STRUCTURE DEPLOYMENT

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG Systems, LLC, Bow, NH (US)

( * ) Notice: Subject to any disclaimer, the term of this patent is extended or adjusted under 35 U.S.C. 154(b) by 0 days.

(21) Appl. No.: 17/701,915

(22) Filed: Mar. 23, 2022

Related U.S. Application Data

(62) Division of application No. 17/475,320, filed on Sep. 14, 2021, now Pat. No. 11,312,466.

(60) Provisional application No. 63/088,995, filed on Oct. 7, 2020, provisional application No. 63/078,102, filed on Sep. 14, 2020.

(51) Int. Cl.
B64B 1/64 (2006.01)
B64B 1/62 (2006.01)
B64B 1/40 (2006.01)

(52) U.S. Cl.
CPC ............ B64B 1/64 (2013.01); B64B 1/40 (2013.01); B64B 1/62 (2013.01)

(58) Field of Classification Search
CPC ...... F17C 1/16; F17C 2201/0176; B64B 1/40; B64B 1/62; B64B 1/64
See application file for complete search history.

(56) References Cited

U.S. PATENT DOCUMENTS

| | | | |
|---|---|---|---|
| 2,384,720 A | 9/1945 | Babcock et al. | |
| 3,204,320 A | 9/1965 | Eckstein et al. | |
| 3,381,655 A | 5/1968 | Rozzelle | |
| 3,993,595 A | 11/1976 | Merkl | |
| 4,134,491 A | 1/1979 | Turillon et al. | |
| 4,264,018 A | 4/1981 | Warren | |
| 4,280,288 A | 7/1981 | Corfa et al. | |
| 4,358,291 A | 11/1982 | Cuomo et al. | |
| 4,446,636 A | 5/1984 | Weinert | |
| 4,586,456 A | 5/1986 | Forward | |

(Continued)

FOREIGN PATENT DOCUMENTS

EP 2980352 A1 2/2016
GB 2356184 A 5/2001

(Continued)

OTHER PUBLICATIONS

Metals Handbook Tenth Edition, "vol. 2, Properties and Selection: Nonferrous Alloys and Special-Purpose Materials", Oct. 1990, pp. 145-146.

Rajagopalan, M. et al., "Atomic-scale analysis of liquid-gallium embrittlement of aluminum grain boundaries", Acta Materialia, vol. 73 Jul. 2014, pp. 312-325.

(Continued)

*Primary Examiner* — Philip J Bonzell
*Assistant Examiner* — Michael B. Kreiner
(74) *Attorney, Agent, or Firm* — The Marbury Law Group, PLLC

(57) ABSTRACT

A system for deploying an inflatable structure may include a balloon defining an envelope having a first stiffness, a valve assembly including a control valve, and a reactor defining a chamber having a second stiffness, the valve assembly disposed in fluid communication between the chamber and the envelope, the control valve selectively actuatable to control fluid communication between the chamber and the envelope, the second stiffness of the chamber greater than the first stiffness of the envelope, and the reactor foldable onto itself along the chamber and elastically deformable to unfold in response to an increase in pressure in the chamber.

20 Claims, 18 Drawing Sheets

(56) References Cited

U.S. PATENT DOCUMENTS

| | | | |
|---|---|---|---|
| 4,770,848 | A | 9/1988 | Ghosh et al. |
| 5,301,631 | A | 4/1994 | Vining |
| 5,372,617 | A | 12/1994 | Kerrebrock et al. |
| 5,620,652 | A | 4/1997 | Tack et al. |
| 5,707,499 | A | 1/1998 | Joshi et al. |
| 6,386,137 | B1 | 5/2002 | Riche |
| 6,506,360 | B1 | 1/2003 | Andersen et al. |
| 6,648,272 | B1 | 11/2003 | Kothmann |
| 7,364,815 | B2 | 4/2008 | Nakagawa et al. |
| 7,803,349 | B1 | 9/2010 | Muradov |
| 8,418,435 | B2 | 4/2013 | Hatoum |
| 8,697,027 | B2 | 4/2014 | Uzhinsky et al. |
| 8,974,765 | B2 | 3/2015 | Boyle et al. |
| 9,090,323 | B1 | 7/2015 | Ratner |
| 10,745,789 | B2 | 8/2020 | Slocum |
| 11,148,947 | B1 | 10/2021 | Slocum et al. |
| 11,312,466 | B1 | 4/2022 | Slocum et al. |
| 11,318,437 | B1 | 5/2022 | Slocum et al. |
| 2002/0088178 | A1 | 7/2002 | Davis |
| 2003/0024323 | A1 | 2/2003 | Wang et al. |
| 2003/0062444 | A1 | 4/2003 | Goodey |
| 2007/0057116 | A1 | 3/2007 | Sinsabaugh et al. |
| 2007/0217972 | A1 | 9/2007 | Greenberg et al. |
| 2008/0063597 | A1 | 3/2008 | Woodall et al. |
| 2008/0193806 | A1 | 8/2008 | Kulakov |
| 2010/0028255 | A1 | 2/2010 | Hatoum |
| 2010/0061923 | A1 | 3/2010 | Reddy |
| 2010/0112396 | A1 | 5/2010 | Goldstein |
| 2012/0052001 | A1 | 3/2012 | Woodall et al. |
| 2012/0100443 | A1 | 4/2012 | Braithwaite et al. |
| 2012/0107228 | A1 | 5/2012 | Ishida et al. |
| 2012/0318660 | A1 | 12/2012 | Cohly et al. |
| 2014/0261132 | A1 | 9/2014 | Zeren et al. |
| 2015/0204486 | A1 | 7/2015 | Hoffmann |
| 2015/0258298 | A1 | 9/2015 | Satoh et al. |
| 2016/0355918 | A1 | 12/2016 | Slocum |
| 2017/0022078 | A1 | 1/2017 | Fukuoka |
| 2019/0024216 | A1 | 1/2019 | Giri et al. |
| 2019/0077510 | A1 | 3/2019 | Panas et al. |
| 2019/0341637 | A1 | 11/2019 | Fine et al. |
| 2020/0199727 | A1 | 6/2020 | Slocum |
| 2020/0199728 | A1 | 6/2020 | Slocum |
| 2020/0262536 | A1 | 8/2020 | Deakin |
| 2021/0061488 | A1 | 3/2021 | Smithers et al. |
| 2021/0115547 | A1 | 4/2021 | Slocum |
| 2021/0276866 | A1 | 9/2021 | Meroueh |
| 2023/0002026 | A1 | 1/2023 | Impaecher et al. |

FOREIGN PATENT DOCUMENTS

| | | | |
|---|---|---|---|
| JP | 2004174301 | A | 6/2004 |
| JP | 2004243151 | A | 9/2004 |
| WO | 2011040942 | A1 | 4/2011 |
| WO | 2015005921 | A1 | 1/2015 |
| WO | 20150077225 | A1 | 5/2015 |
| WO | 2016196718 | A1 | 12/2016 |
| WO | 202134805 | A1 | 2/2021 |
| WO | 2021119628 | A1 | 6/2021 |

OTHER PUBLICATIONS

Choi, Go et al., "Mechanism of Hydogen Generation via Water Reaction with Aluminum Alloys", Generating hydrogen on demand Jun. 28, 2010, 4 pages.

Parmuzina, A.V. et al., "Oxidation of activated aluminum with water as a method for hydogen generation", Russian Chemical Bulletin, International Edition, vol. 58, No. 3 Mar. 2009, pp. 493-989.

Vitos, L. et al., "The Surface Energy of Metals", Elsevier Surface Science 411, 1998, pp. 186-202.

"Fundamentals of Adhesion edited by Lieng-Huang Lee", Xerox Corporation, 1991, pp. 333-336.

Ansara, I. et al., "Thermodynamic Analysis of the Ga—In, Al—Ga, Al—In and the Al—Ga—In Systems", Calphad vol. 2, No. 3 1978, pp. 187-196.

EPO, "EP Application Serial No. 16804381.8, Extended European Search Report dated Oct. 26, 2018", 7 pages.

WIPO, "PCT Application No. PCT/US16/35397, International Preliminary Report on Patentability dated Dec. 5, 2017", 11 pages.

ISA, "PCT Application No. PCT/US16/35397, International Search Report and Written Opinion dated Sep. 7, 2016", 13 pages.

B. Wan et al., "Review of solid state recycling of aluminum chips", Elsevier, Resources, Conservation & Recycling 125 (2017) pp. 37-47.

U.S. Appl. No. 16/804,643, Non-Final Office Action dated Apr. 15, 2021, 22 pages.

U.S. Appl. No. 17/134,757, Non-Final Office Action dated Apr. 1, 2021, 19 pages.

U.S. Appl. No. 16/804,676, Non-Final Office Action dated Jul. 21, 2021, 17 pages.

U.S. Appl. No. 15/171,053, Non-Final Office Action dated Sep. 19, 2019, 28 pages.

Shara Tonn, "Stanford engineers discover how seawater saltsaffect coastal algae, good and bad", Stanford News, May 9, 2016, 3 pages, https://news.stanford.edu/2016/05/09/stanford-engineers-discover-seawater-salts-good-bad-effects-coastal-algae/.

Y. Lu et al., "Total phenolic, flavonoid content, and antioxidant activity of flour, noodles, and steamed bread made from different colored wheat grains by three milling methods", The Crop Journal 3 (2015) pp. 328-334.

J. Higdon, "Flavonoids" Oregon State University, Linus Pauling Institute, Micronutrient Information Center, 50 pages, 2005 (Copyright 2005-2021).

Nielsen et al., "Flavonoids in Human Urine as Biomarkers for Intake of Fruits and Vegetables", Cancer Epidemiology, Biomarkers & Prevention, vol. 11, 459-466, May 2002 (9 pages).

Mennen et al., "Urinary flavonoids and phenolic acids as biomarkers of intake for polyphenol-rich foods", British Journal of Nutrition (2006), 96, 191-198, DOI: 10.1079/BJN20061808 (8 pages).

Lauren Meroueh "Effects of Doping and Microstructural Variables on Hydrogen Generated via Aluminum-Water Reactions Enabled by a Liquid Metal", Massachusetts Institute of Technology (MIT), Department of Mechanical Engineering, Sep. 2020, 127 pages.

Chao et al., "Maximized On-Demand Hydrogen Genertor Design", Adv. Mat.Res. V 690-693. pp. 954-961 (2013).

Can Dimensions, Twin Monkeys Beverage Canning Systems, 3 pages; retrieved on Apr. 5, 2021; https://twinmonkeys.net/can-dimensions/.

U.S. Appl. No. 17/014,593, Notice of Allowance dated Jun. 3, 2021; 15 pages.

U.S. Appl. No. 17/014,593, Notice of Allowance dated Jan. 22, 2021; 19 pages.

U.S. Appl. No. 15/171,053 Notice of Allowance dated Feb. 10, 2020, 12 pages.

U.S. Appl. No. 15/171,053, Non-Final Office Action dated Jun. 6, 2018, 14 pages.

U.S. Appl. No. 17/340,769, Non-Final office Action dated Aug. 11, 2021, 11 pages.

U.S. Appl. No. 17/014,593, Restriction Requirement dated Dec. 8, 2020, 7 pages.

U.S. Appl. No. 17/177,144, Notice of Allowance dated Jul. 21, 2021, 14 pages.

International Search Report and Wrillen Opinion; International Application No. PCT/US2020/064953; ISA European Patent Office; dated May 25, 2021. (18 pages).

U.S. Appl. No. 16/804,676, Notice of Allowance dated Jan. 25, 2022; 25 pages.

U.S. Appl. No. 17/475,320, Notice of Allowance dated Mar. 9, 2022; 24 pages.

PCT; International Application No. PCT/IS2020/064953; International Preliminary Report on Patentability; dated May 17, 2022; 11 pages.

U.S. Patent and Trademark Office, "Notice of Allowance," issued in related U.S. Appl. No. 17/685,765, dated Dec. 16, 2022 (10 Pages).

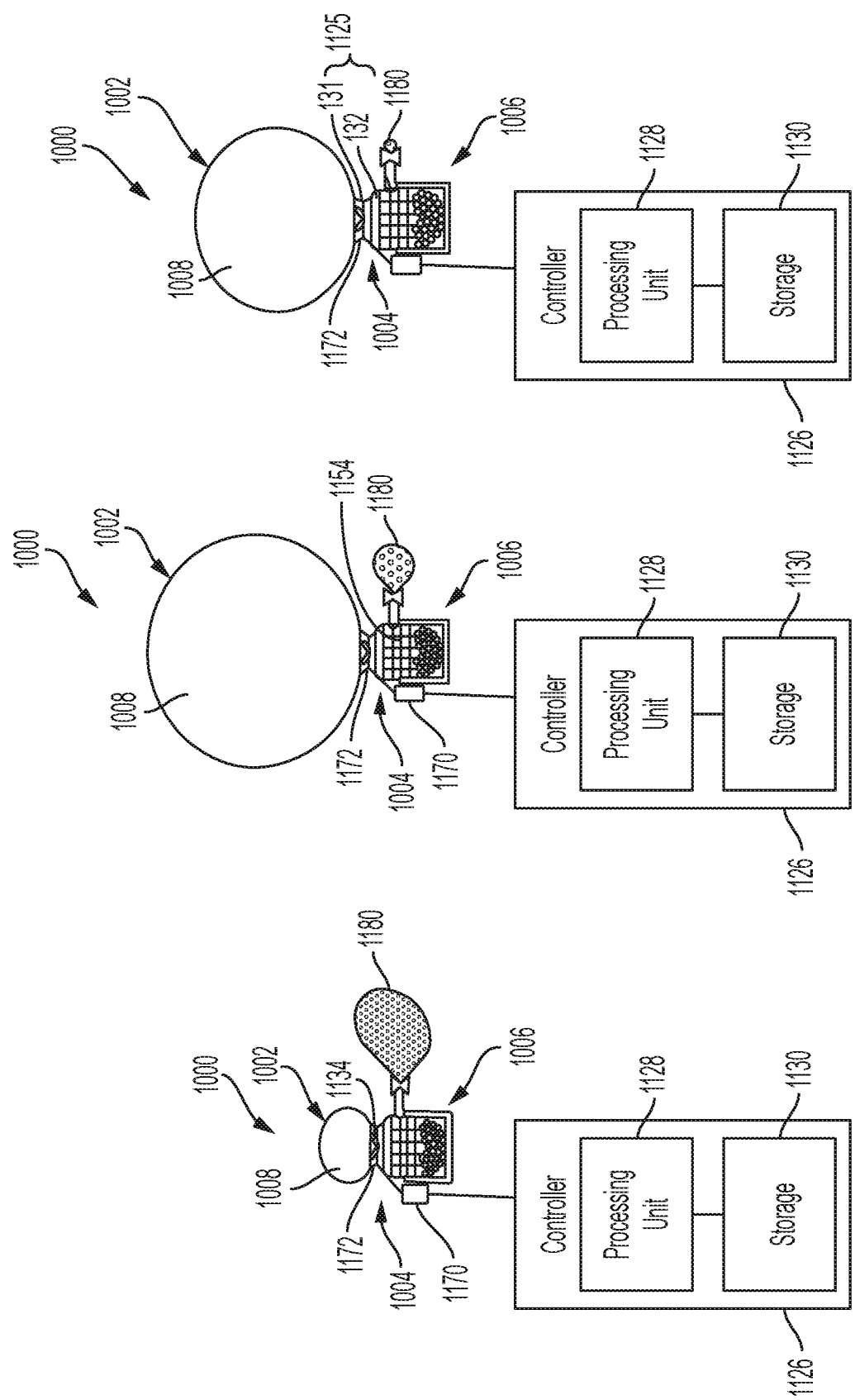

INFLATABLE STRUCTURE DEPLOYMENT

CROSS-REFERENCE TO RELATED APPLICATIONS

This application is a divisional of Ser. No. 17/475,320, filed Sep. 14, 2021, and claims priority to U.S. Provisional Application 63/078,102, filed Sep. 14, 2020, and to U.S. Provisional Application 63/088,995, filed Oct. 7, 2020, with the entire contents of each of these applications hereby incorporated herein by reference.

BACKGROUND

Balloons can be filled with a lifting gas to allow the balloon to float in any one or more of various different media. As an example, balloons in the form of weather balloons are commonly used for meteorological observation of localized conditions that may not be accurately measurable using ground-based measurements or satellite images. The time and equipment required to inflated balloons, however, can limit the types of applications in which balloons may be used.

There remains a need for filling balloons rapidly, using equipment that may be amenable to transportation and storage across a variety of field conditions.

SUMMARY

According to one aspect, a system for deploying an inflatable structure may include a balloon defining an envelope having a first stiffness, a valve assembly including a control valve, and a reactor defining a chamber having a second stiffness, the valve assembly disposed in fluid communication between the chamber and the envelope, the control valve selectively actuatable to control fluid communication between the chamber and the envelope, the second stiffness of the chamber greater than the first stiffness of the envelope, and the reactor foldable onto itself along the chamber and elastically deformable to unfold in response to an increase in pressure in the chamber.

In certain implementations, the balloon may include a first substrate along the envelope, the reactor includes a second substrate along the chamber, the first substrate is hydrophobic along the envelope, and the second substrate has a melt temperature above 100° C. along the chamber. Further, or instead, the first substrate may have a first average thickness, and the second substrate may have a second average thickness greater than the first average thickness of the first substrate. Additionally, or alternatively, the reactor may further include a reinforcement disposed along at least a portion of the second substrate along the chamber, the reinforcement includes at least one reinforcement material, and the at least one reinforcement material is less elastic than the second substrate. The reinforcement may include a plurality of fibers of the at least one reinforcement material, and the plurality of fibers are at least partially embedded along at least a section of the second substrate. Further, or instead, the reinforcement may extend at least circumferentially about the chamber. As an example, the reinforcement may include a basket, an annulus, or a combination thereof. In some cases, the reinforcement material may include wicker. Additionally, or alternatively, in air at standard temperature and pressure, the at least one reinforcement material may have a lower ignition temperature than the second substrate. Further, or instead, the reinforcement material may be disposed along the second substrate with a maximum volumetric concentration of the reinforcement material along an end portion of the chamber opposite the valve assembly.

In certain implementations, the control valve may include a check valve, and the check valve is self-actuatable in response to a pressure difference between the chamber of the reactor and the envelope of the balloon.

In some implementations, the valve assembly may further include a connector and a controller, wherein the connector includes a first portion, a second portion, and an actuator, the first portion of the connector is mechanically coupled to the balloon, the second portion of the connector is mechanically coupled to the reactor, the actuator is actuatable to release the first portion and the second portion of the connector from one another, the controller is in electrical communication with the actuator, and the controller is configured to send a first actuation signal to the actuator to release the first portion and the second portion of the connector from one another. In some instances, the controller may be further configured to send a second actuation signal to the control valve to restrict fluid communication between the chamber of the reactor and the envelope of the balloon Further, or instead, the system may include at least one sensor in electrical communication with the controller, wherein the controller is further configured to receive one or more feedback signals from the at least one sensor, the one or more feedback signals are indicative of one or more parameters associated with at least one of the balloon or the reactor, and the first actuation signal from the controller to the actuator is based on the one or more feedback signals. As an example, the one or more parameters indicated by the one or more feedback signals may include pressure in the chamber of the reactor, pressure in the envelope of the balloon, pressure in an environment outside of the balloon, temperature in the chamber of the reactor, altitude of the balloon, or any combination thereof. Further, or instead, the connector may include a quick-disconnect valve, and the actuator includes a solenoid actuatable to control the quick-disconnect valve. Additionally, or alternatively, the reactor and the balloon may be a monolith at least along the connector of the valve assembly, and the actuator is operable to split the monolith along the connector of the valve assembly to release the first portion of the connector from the second portion of the connector. The actuator may, for example, include a wire operable to split the monolith through heat directed to the monolith via the wire. Further, or instead, the actuator may include a spring-loaded blade operable to split the monolith through movement of the spring-loaded blade through the monolith. The control valve may include a clamp and a necked region, the necked region extends between the reactor and the balloon, the clamp is operable to pinch the necked region, the controller is in electrical communication with the clamp, and the controller is configured to send a second actuation signal to the clamp to restrict fluid communication between the chamber of the reactor and the envelope of the balloon.

In some implementations, the system may include a cinch extending circumferentially about the reactor along the chamber, wherein the chamber is contractable in response to tension in the cinch to push gases from the chamber into the envelope of the balloon via the valve assembly.

In certain implementations, the system may include a parachute and cords, wherein the parachute is coupled to the reactor via the cords, and the chamber is contractable in response to tension on the cords from air resistance of the parachute.

In some implementations, the system may include a fill valve actuatable to control fluid communication between the chamber of the reactor and an environment outside of the chamber of the reactor.

According to another aspect, a method of deploying an inflatable structure may include forming a hydrogen-containing gas in a chamber defined by a reactor coupled to a balloon defining an envelope, flowing the hydrogen-containing gas from the chamber of the reactor into the envelope of the balloon based on a difference in stiffness between the chamber and the envelope, sealing the hydrogen-containing gas in the envelope of the balloon, and disconnecting the reactor from the balloon with the hydrogen-containing gas sealed therein.

In some implementations, the method may include placing one or more reinforcement materials along the chamber of the reactor. As an example, placing the one or more reinforcement materials along the chamber of the reactor may include placing the chamber of the reactor in a hole dug in earth.

In certain implementations, the method may include actuating a float valve to drain condensed water the envelope of the balloon.

BRIEF DESCRIPTION OF THE FIGURES

FIG. 10A is a schematic representation of a system for deployment of an inflatable structure, the system including a reactor and a balloon connected together as a monolith, the system shown at a first time prior to introduction of water onto reactants in a chamber of the reactor.

FIG. 10B is a schematic representation of the system of FIG. 9A, the system shown at a second time following introduction of water onto reactants in the chamber to form a lifting gas, and the lifting gas shown in the balloon.

FIG. 10C is a schematic representation of the system of FIG. 9A, the system shown at a third time following condensation of water out of the lifting gas in the balloon.

Like reference symbols in the various drawings indicate like elements.

DETAILED DESCRIPTION

Figure 1A:
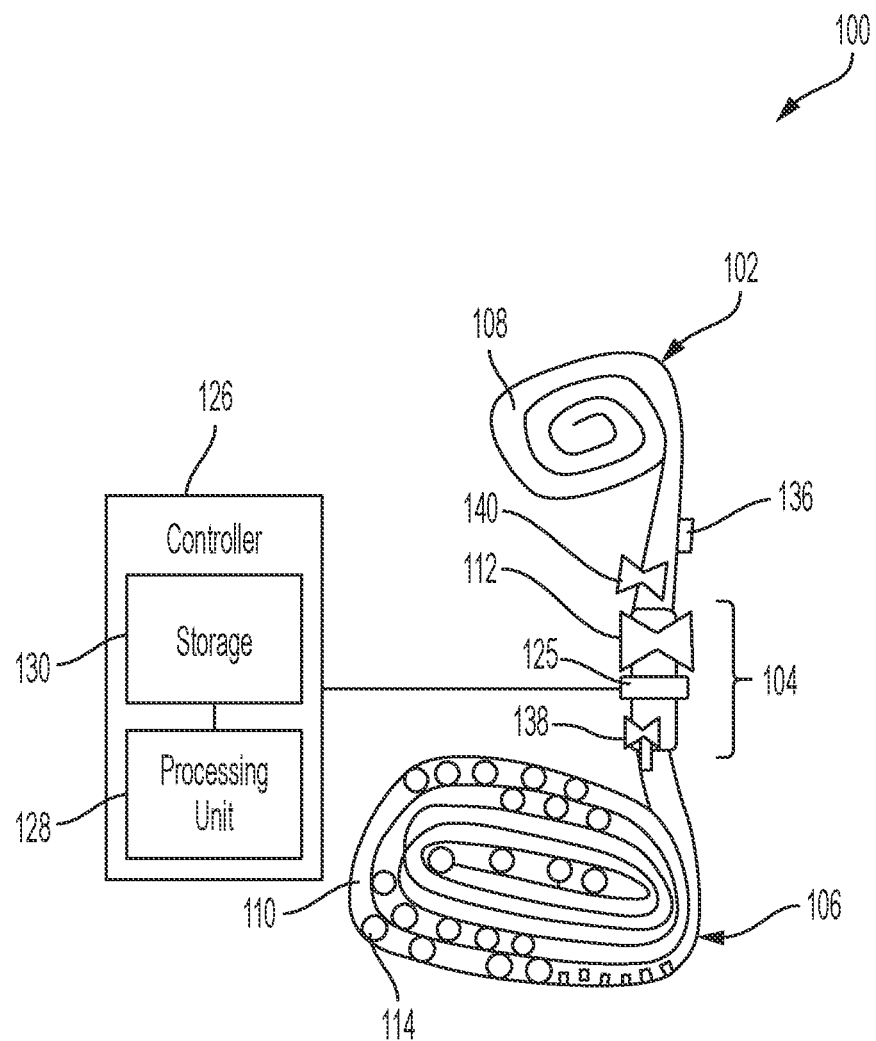
FIG. 1A is a schematic representation of a system for deploying an inflatable structure, the system including a reactor and a balloon coupled to one another, and the system shown at a first time with a chamber of the reactor folded onto itself and containing reactants prior to reaction.
Figure 1B:
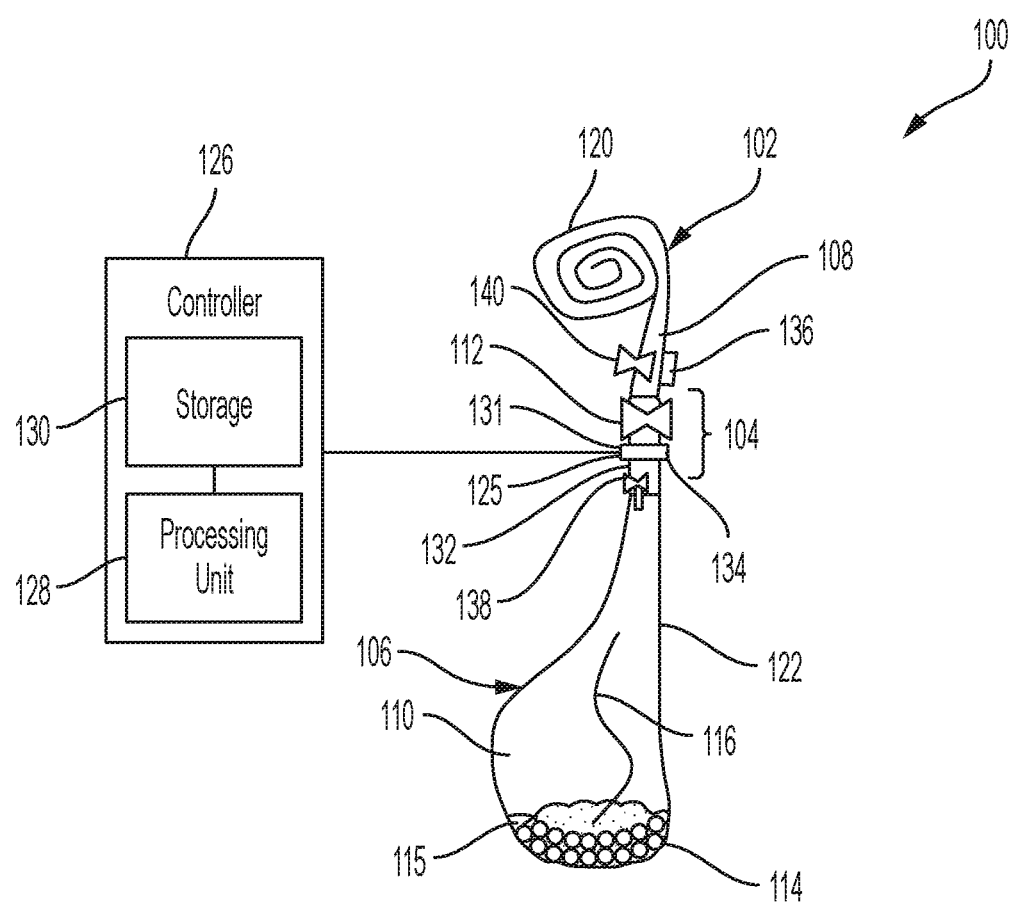
FIG. 1B is a schematic representation of the system of FIG. 1A, with the system shown at a second time with the reactants partially reacted in the chamber of the reactor such that the chamber of the reactor elastically deformed to unfold in response to an increase in pressure in the chamber.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the description that follows, deployment of inflatable structures is generally described. As used herein, the term "inflatable structure" shall be understood to include a balloon connected in fluid communication to a chamber of a reactor or a balloon by itself (e.g., after the reactor has been jettisoned in instances in which the balloon is intended to be released from the reactor). For example, the various different systems described herein facilitate rapid inflation of the balloon such that, in some instances, deployment of an inflatable structure may include releasing a system (e.g., midair or in water) while the balloon is being filled with lifting gas being generated in the chamber of the reactor such that the inflatable structure may at least initially include the balloon connected in fluid communication to the chamber of the reactor. In some implementations, the reactor may be jettisoned from the balloon once the balloon after the balloon has been filled with lifting gas and, in such use cases, the inflatable structure shall be understood to include only the balloon following disconnection of the balloon from the reactor.

As used herein, unless otherwise specified or made clear from the context, the term "balloon" shall be understood to include any manner and form of object that can receive lifting gas to have at least some degree of buoyancy in ambient air, in water, or in any other medium, whether in an indoor or an outdoor environment. In use, such balloons may be used to make observations (e.g., about weather in the atmosphere, conditions below or around the balloon), carry passengers and/or cargo, broadcast and/or receive signals beyond the balloon, collect data, lift structures, etc. Accordingly, as used herein, balloons may include any one or more of various different manned or unmanned craft, dirigible or non-dirigible craft, independently propelled or floating craft, rigid or nonrigid craft, tethered or untethered craft, or combinations thereof.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

Referring now to FIGS. 1A-1D, a system 100 for deployment of an inflatable structure may include a balloon 102, a valve assembly 104, and a reactor 106. The valve assembly 104 may be disposed in fluid communication between the chamber 110 and the envelope 108 (e.g., the valve assembly 104 may be coupled to one or both of the balloon 102 or the reactor 106) and, in some instances, the valve assembly 104 may include a control valve 112 selectively actuatable to control fluid communication between the chamber 110 and the envelope 108. The balloon 102 may define an envelope 108 having a first stiffness, and the reactor 106 may define a chamber 110 having a second stiffness greater than the first stiffness. The reactor 106 may be foldable (e.g., rolling or in a pattern) onto itself along the chamber 110 and elastically deformable to unfold in response to an increase in pressure in the chamber 110. With greater stiffness along the chamber 110 of the reactor 106 than along the envelope 108 of the balloon 102, the stiffness of the chamber 110 of the reactor 106 may overcome stiffness of the envelope 108 of the balloon 102, forcing lifting gas from the chamber 110 into the envelope 108. As compared to a configuration in which stiffness is the same throughout the system, the stiffness differential between the chamber 110 of the reactor 106 and the envelope 108 of the balloon 102 results in faster inflation of the balloon 102. Further, while the chamber 110 of the reactor 106 is relatively stiffer than the envelope 108 of the balloon 102, the reactor 106 is nevertheless initially flexible (e.g., compliant) to facilitate storage, transport to an end-use location, and/or deployment at an end-use location.

In use, as also described in greater detail below, the chamber 110 of the reactor 106 may contain a fuel 114 reactable with water to produce a lifting gas. The fuel 114 may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference. The reactor 106 may be folded along the chamber 110 at the time of initial use of the system 100, such as may be useful for deployment of a balloon from space-constrained surroundings (e.g., an aircraft and/or an underwater vehicle). Water 115 may be introduced to the fuel 114 in the chamber 110 of the reactor 106. As the fuel 114 and the water 115 react in the chamber 110 to produce a hydrogen-containing gas 116, pressure in the chamber 110 may increase. As the pressure in the chamber 110 increases, the chamber 110 may unfold, from an initial folded configuration, to accommodate the hydrogen-containing gas 116. The control valve 112 may be actuated to open to allow the hydrogen-containing gas 116 in the pressurized environment in the chamber 110 to flow into the envelope 108 to inflate the balloon 102. With fluid communication between the chamber 110 and the envelope 108 established via the control valve 112, the stiffness difference between the chamber 110 and the envelope 108 may facilitate increasing the speed of this flow such that the balloon 102 may be inflated rapidly. Thus, the combination of relative stiffness and foldability of the reactor 106 is a robust solution for balancing competing considerations associated with rapidly filling the balloon 102 with a lifting gas while requiring only an efficient amount of material and equipment. The effectiveness of this combination of features of the system 100 shall be described in greater detail below in the context of the advantages provided by the system 100 with respect to certain exemplary use cases, such as mid-air deployment and/or underwater deployment.

In some implementations, the speed at which the hydrogen-containing gas 116 is produced in the chamber 110 may be a primary factor in determining the size of the chamber 110. The speed of production of the hydrogen-containing gas 116 is a function of the ratio of the water 115 to the fuel 114 initially in the chamber 110. A minimum mass ratio of the water 115 to the fuel 114 has been found to be about 5:1 to fully react the fuel 114 and leave an essentially dry powder as a waste by-product. However, at a 5:1 mass ratio, the pressure rise in the chamber 110 may be incompatible with forming the reactor 106 to be flexible enough to be foldable onto itself along the chamber 110. While higher mass ratios result in slower reaction times and lower pressures, slower times may not be acceptable for some implementations and the additional water required to achieve such ratios may be impractical for certain applications, such as those requiring mobility. In practice, a water-to-fuel mass ratio of 8:1 has been found to be a practical compromise—making efficient use of water to produce the hydrogen-containing gas 116 rapidly while also having a pressure profile that is sustainable by various different types of flexible materials. That is, at a water-to-fuel mass ratio of 8:1, the chamber 110 of the reactor 106 may unfold to the volume needed for the reaction to occur while accommodating pressure associated with steam and by-product formation, thus eliminating the need to carry a large, fixed-volume container to the site of use.

For a reaction that produces the hydrogen-containing gas 116 in five minutes, the chamber 110 of the reactor 106 may have a fully inflated volume of 0.2 cubic meters, and the fully inflated volume of the envelope 108 of the balloon 102 may be 10 cubic meters (a volumetric ratio of 50:1). Reactions faster than five minutes require a lower volumetric ratio (e.g., 20:1). Higher volumetric ratios (e.g., 500:1) may be appropriate in implementations in which longer reaction times are acceptable. Further, or instead, in implementations in which the reactor 106 is in water or another medium that facilitates condensation of steam, high volumetric ratios may also be acceptable.

In general, the balloon 102 may include at least a first substrate 120 along the envelope 108, and the reactor 106 may include at least a second substrate 122 along the chamber 110. In certain instances, the first substrate 120 and the second substrate 122 may be the same material, such as may be useful for manufacturability of the system 100 (e.g., facilitating formation of one or more monolithic structures described herein). In other instances, the first substrate 120 and the second substrate 122 may include different materials, such as materials with different elasticity to facilitate achieving the stiffness differential between the chamber 110 and the envelope 108. In particular, one or both of the first substrate 120 or the second substrate 122 may include at least one compliant polymer, such as biaxially-oriented polyethylene terephthalate (commercially known as Mylar®, available from Dupont Tejjin Films USA of Chester, Va.) or latex.

The respective environments within the envelope 108 and the chamber 110 may additionally, or alternatively, inform features of the first substrate 120 and the second substrate 122, respectively. For example, the first substrate 120 may be hydrophobic along the envelope 108 to facilitate withstanding exposure to moisture that may come into contact with the first substrate 120 as steam in the hydrogen-containing gas 116 condenses in the envelope 108 condenses. Further, or instead, the second substrate 122 of the reactor 106 may have a melt temperature above 100° C. along the chamber 110 to reduce the likelihood that the second substrate 122 will degrade in the presence of the heat generated by reaction of the water 115 and the fuel 114 in the chamber 110. In any one or more implementations in which the system 100 may be deployed at altitude, the second substrate 122 may include one or more materials (e.g., polymers) with a melt temperature less than 100° C. At high altitudes, water boils at lower temperatures. For example, at 5000 ft. water boils at 95° C. Since reaction in the chamber is not significantly pressurized, the peak temperature of the reaction is limited at high elevations, thus facilitating use of certain materials having a melt temperature below 100° C., but at a temperature greater than the reaction peak temperature at a predetermined altitude of deployment of the system 100.

In certain implementations, the stiffness differential between the chamber 110 and the envelope 108 may be at least partially attributable to differences in one or more material and/or structural properties of the first substrate 120 relative to those of the second substrate 122. As an example, the first substrate 120 may have a first average thickness along the envelope 108, and the second substrate 122 may have a second average thickness along the chamber 110. The second average thickness of the second substrate 122 may be greater than the first average thickness of the first substrate 120, with this relative difference in average thickness contributing to the relative difference in stiffness between the chamber 110 and the envelope 108. As a specific example, the second average thickness of the second substrate 122 of the chamber 110 may be twice that of the first average thickness of the first substrate 120 of the envelope 108 to facilitate flowing hydrogen-containing gas from the chamber 110 into the envelope 108. While such difference in thickness may be sufficient for achieving a stiffness difference between the chamber 110 and the envelope 108 in some instances, it shall be appreciated that foldability of the reactor 106 along the chamber 110 may be a practical upper limit to the second average thickness along the chamber 110 while durability may be a practical lower limit to the first average thickness along the envelope 108.

In certain implementations, the valve assembly 104 may further include a connector 125 and a controller 126. The controller 126 may include a processing unit 128 and non-transitory computer-readable storage media 130 having stored thereon instructions for causing the processing unit 128 to carry out one or more aspects of any one of the various different techniques of operating the valve assembly 104. The connector 125 may include a first portion 131, a second portion 132, and an actuator 134. The first portion 131 of the connector 125 may be mechanically coupled to the balloon 102, and the second portion 132 of the connector 125 may further, or instead, be mechanically coupled to the reactor 106. The actuator 134 may be actuatable (e.g., electrically actuatable) to release the first portion 131 and the second portion 132 of the connector 125 from one another. For example, the controller 126 may be in electrical communication with the actuator 134, and the non-transitory computer-readable storage media 130 may have stored thereon instructions for causing the processing unit 128 to send a first actuation signal to the actuator 134 to release the first portion 131 and the second portion 132 of the connector 125 from one another, thus jettisoning the reactor 106 and the reaction by-products therein. As an example, the connector 125 may be a quick-dis connect valve, and the actuator may be solenoid actuatable by the controller 126 to release the quick-disconnect valve. With the weight of the reactor 106 and the reaction by-products removed, the balloon 102 filled with hydrogen-containing gas may float away from the reactor 106. While the quick-disconnect valve may be actuatable using a solenoid, it shall be appreciated that other types of actuation may be additionally or alternatively possible. For example, the quick-disconnect valve may include a bistable structure with a sharp edge triggered by a signal from the controller 126 to cause the sharp edge to pierce or cut through a thin rubber or wax lined paper tube connecting the balloon 102 to the reactor 106.

In certain implementations, the non-transitory computer-readable storage media 130 may additionally, or alternatively, have stored thereon instructions for causing the processing unit 128 to send a second actuation signal to the control valve 112 to open or close the control valve 112. For example, the second actuation signal may open the control valve 112 after the hydrogen-containing gas in the chamber 110 of the reactor 106 has cooled such that steam has condensed to water in the reactor. Further, or instead, the second actuation signal may close the control valve 112 to restrict fluid communication between the chamber 110 of the reactor 106 and the envelope 108 of the balloon 102, such as may be useful for maintaining the hydrogen-containing gas 116 within the envelope 108 of the balloon 102 such that the hydrogen-containing gas 116 may continue to provide lifting force to the balloon 102 after the reactor 106 has been jettisoned. While the reactor 106 may be jettisoned from the balloon 102 in some instances, it shall be appreciated that removal of the dead-weight associated with the by-products may be additionally or alternatively achieved according to one or more other techniques. For example, in some instances, the reactor 106 may be intentionally ruptured such that byproducts in the chamber 110 may gradually spill out of the chamber 110, such as may be useful for spreading the byproducts over a large area.

While the control valve 112 may be electrically actuated by the controller in some implementations, it shall be appreciated that other types of actuation of the control valve 112 are additionally, or alternatively, possible. For example, the control valve 112 may be a check valve self-actuatable in response to a pressure difference between the chamber 110 of the reactor 106 and the envelope 108 of the balloon. As a specific example, the control valve 112 may be a duck-bill valve, which is self-sealing once the hydrogen-containing gas 116 is moved from the chamber 110 to the envelope 108.

In some implementations, the system 100 may include at least one sensor 136 in electrical communication with the controller 126. The non-transitory computer-readable storage media 130 may have stored thereon instructions for causing the processing unit 128 to receive one or more feedback signals from the at least one sensor 136 and the first actuation signal from the controller 126 to the actuator 134 to release the connector 125 may be based on the one or more feedback signals. The one or more feedback signals may be indicative, for example, one or more parameters associated with at least one of the balloon 102 or the reactor 106. By way of example and not limitation, the one or more parameters may include pressure in the chamber of the reactor, pressure in the envelope of the balloon, pressure in an environment outside of the balloon, temperature in the chamber of the reactor, altitude of the balloon, or any combination thereof.

The valve assembly 104 may additionally, or alternatively, include a fill valve 138 in fluid communication between the chamber 110 and an environment outside of the chamber 110, which may be air or a water source. In general, the water 115 may be introduced into the chamber 110 via the fill valve 138. For example, the fuel 114 may be pre-packed in the chamber 110 of the reactor 106 in a form factor in which the reactor 106 may be foldable along the chamber 110 with the fuel 114 therein, such as described in U.S. Pat. No. 11,111,141, issued to Jonathan T. Slocum and Alexander H. Slocum, on Sep. 7, 2021, and entitled "STORING ACTIVATED ALUMINUM," the entire contents of which are hereby incorporated herein by reference.

Figure 1C:
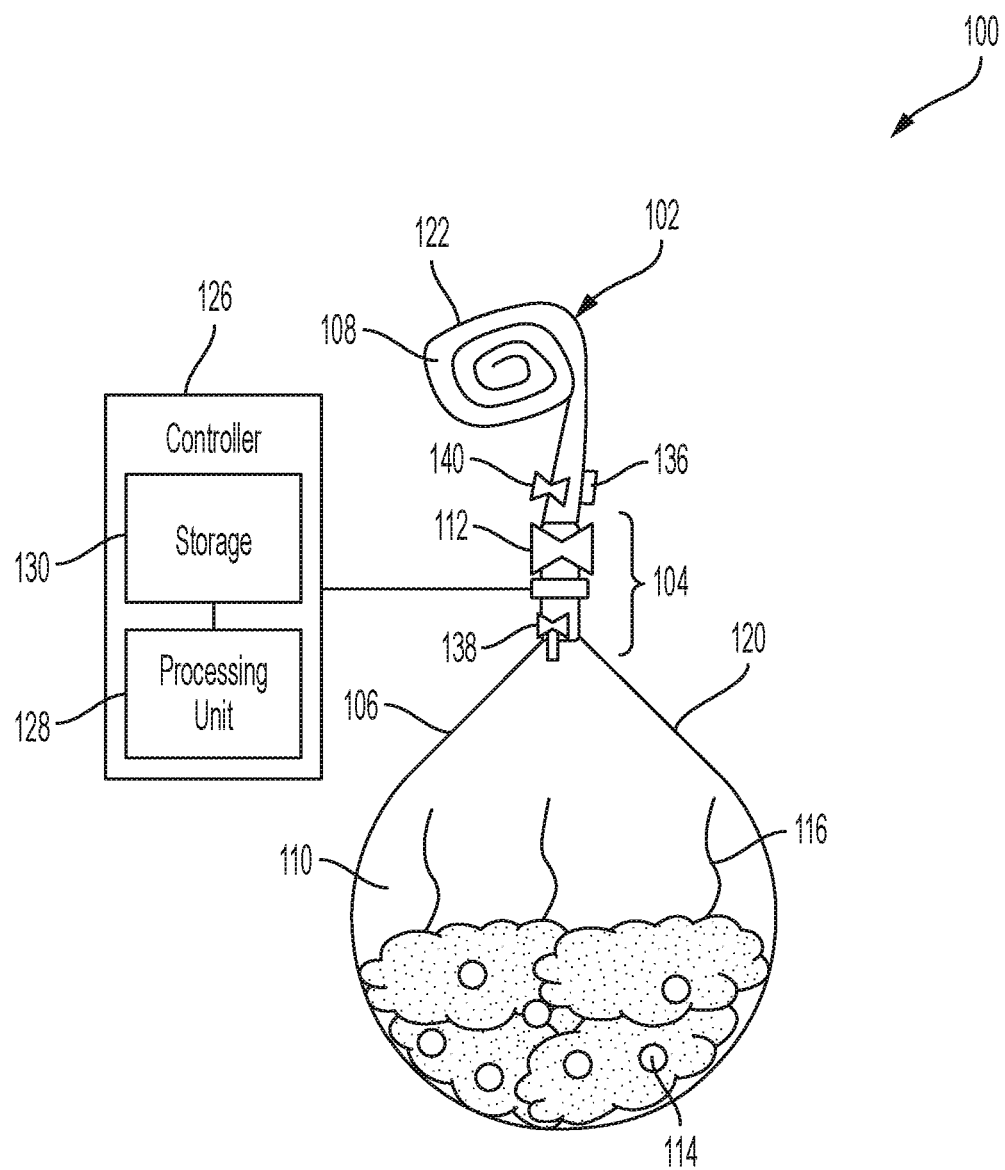
FIG. 1C is a schematic representation of the system of FIG. 1A, with the system shown at a third time with the reactants completely reacted in the chamber of the reactor prior to actuation of a control valve to allow lifting gas in the chamber to flow into the balloon.
Figure 1D:
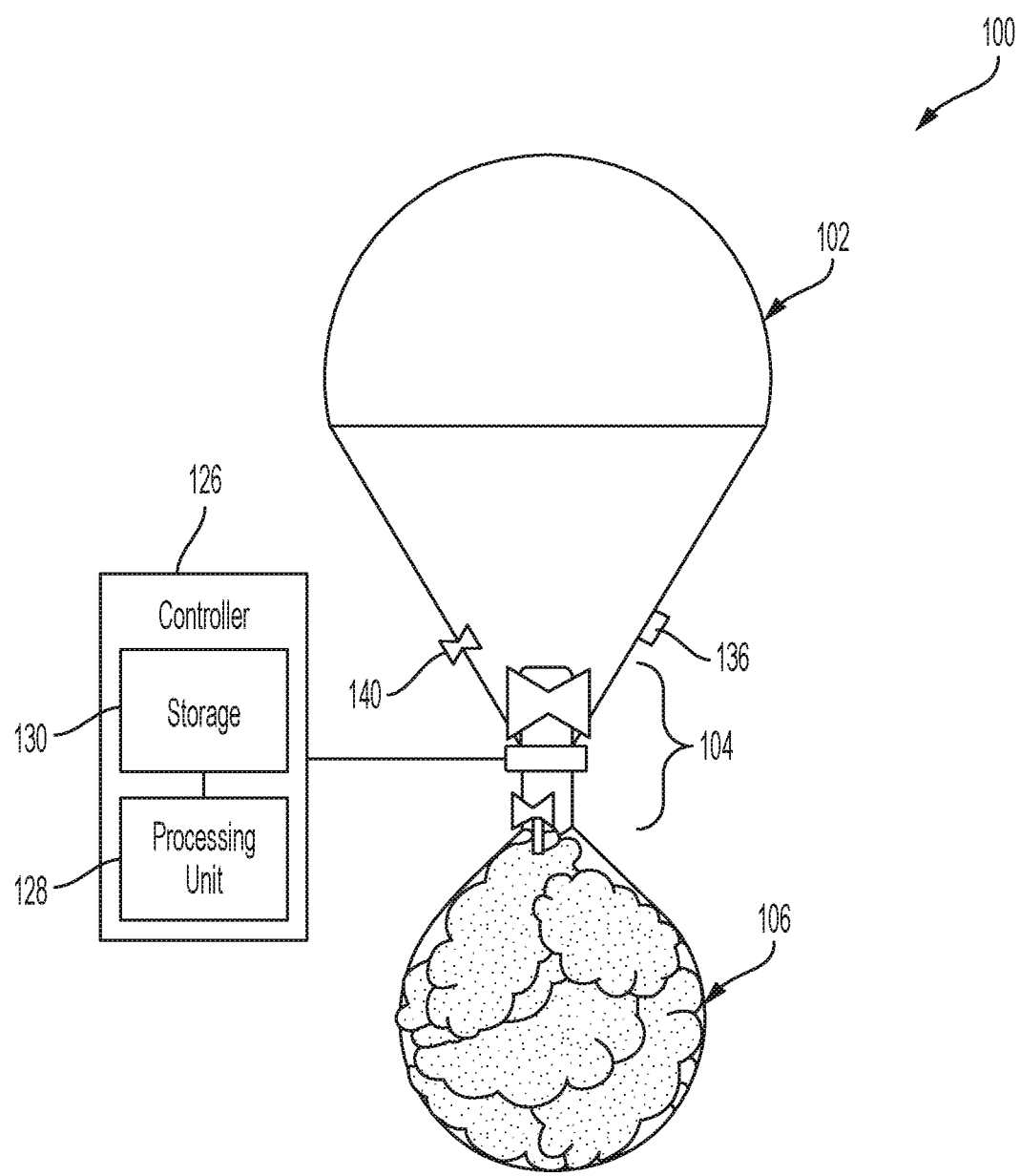
FIG. 1D is a schematic representation of the system of FIG. 1A, with the system shown at a fourth time with the control valve actuated to allow the lifting gas to flow from the chamber of the reactor into the balloon.

For example, the fuel 114 may be stored in the reactor 106 in an inert environment (e.g., a vacuum and/or an inert gas) to reduce the likelihood that aluminum in the fuel 114 may become inadvertently oxidized or otherwise contaminated prior to use of the system 100 in the field. The system 100 may be initially in a compact form factor in which at least the reactor 106 may be folded onto itself. The water 115 may be introduced into the chamber 110 via the fill valve 138 and, as the hydrogen-containing gas 116 forms in the chamber 110, the reactor 106 may elastically deform to unfold the chamber in response to increasing pressure in the chamber 110. Thus, the reaction itself may change the form factor of the chamber 110 from one that is useful for efficient transport and/or storage to one that accommodates rapid formation of large quantities of hydrogen-containing gas. In some instances, the gradual unfolding of the chamber 110 through elastic deformation of the reactor 106 may provide a physical restriction on the rate of introduction of the water 115 to the fuel 114 such that the fuel 114 may be reacted more slowly, as compared to a time for reaction in an unfolded chamber. As shown in FIG. 1C, as the hydrogen-containing gas 116 continues to be formed in the chamber 110, the pressure in the chamber 110 may cause the chamber 110 to elastically expand. Such elastic expansion of the chamber 110 may be useful, for example, for reducing the likelihood that plumbing of the valve assembly 104 may be subjected to high pressures that may lead to degraded performance of the valve assembly 104.

Additionally, or alternatively, the valve assembly 104 may include a float valve 140 disposed along the envelope 108. As water condenses out of the hydrogen-containing gas 116 in the envelope, a volume of water may collect along a bottom portion of the envelope 108 under the force of gravity. At a predetermined depth, the collected volume of water may actuate the float valve 140 (e.g., by pushing the float valve 140 to an open position) such that at least a portion of the volume of water may be released from the envelope 108. As an example, the float valve 140 may be any one or more of the various different float valves described in U.S. Pat. App. Pub. No. 2021/0237843, by Alexander H. Slocum and Jonathan T. Slocum, published on Aug. 5, 2021, entitled "CONTROLLING LIFTING GAS IN INFLATABLE STRUCTURES," the entire contents of which are hereby incorporated herein by reference.

Having described various aspects of the system 100, attention is now directed to certain exemplary end-use cases useful for highlighting various different aspects of the system 100 useful for rapid generation of the hydrogen-containing gas 116.

Referring now to FIGS. 1A-1D and FIGS. 2A-2C, the system 100 may be deployed below a water surface S of a body of water W. Water from the body of water W may be introduced into the chamber 110 to react with the fuel 114 in the chamber 110 according to any one or more of the various different techniques described herein. The hydrogen-containing gas 116 formed in the chamber 110 while the system 100 is below the water surface S of the water W may provide buoyancy force to the system 100 such that the system 100 may rise toward the water surface S. In some instances, the buoyancy force provided to the system 100 may deliver the system to the water surface S. Further, or instead, the buoyancy force provided to the system 100 may allow at least a portion of the system 100 to continue rising into the air, with the overall result being that the balloon 102 may be launched into the air from a position under the water surface S. While the hydrogen-containing gas 116 may provide buoyancy for all components of the system 100 over the entire duration of the excursion, it shall be appreciated that the reactor 106 may be decoupled from the balloon 102 at any point along the excursion as may be useful for achieving efficient use of the hydrogen-containing gas 116. That is, once all of the fuel 114 has been reacted in the chamber 110 to form the hydrogen-containing gas 116, and the hydrogen-containing gas 116 has fully inflated the envelope 108 of the balloon 102, the reactor 106 may be decoupled from the balloon 102 (e.g., at or near the water surface S such that the reactor may sink in the body of water W). This may facilitate extending travel of the balloon 102 without the weight of the reactor 106.

In certain implementations, at least a portion of the system 100 (e.g., the balloon 102) may carry a payload 142. For example, the payload 142 may include computers, data collection devices, and data transfer systems in electrical or radio communication with another party (e.g., a manned or unmanned underwater vehicle, a surface ship, a ground base, an aircraft). Thus, continuing with this example, the system 100 may be deployed under the water surface S to deliver the payload as part of a data storage, lofting, and transmission operation.

In certain implementations, referring now to FIGS. 1A-1D and FIGS. 2A-2C, the system 100 may be deployed from an underwater vehicle 144. For the sake of clear and efficient description, the underwater vehicle 144 is shown and described as a submarine. However, unless otherwise specified or made clear from the context, it shall be understood that the underwater vehicle 144 may be any one or more of various different types of manned or unmanned underwater vehicles.

Figure 2A:
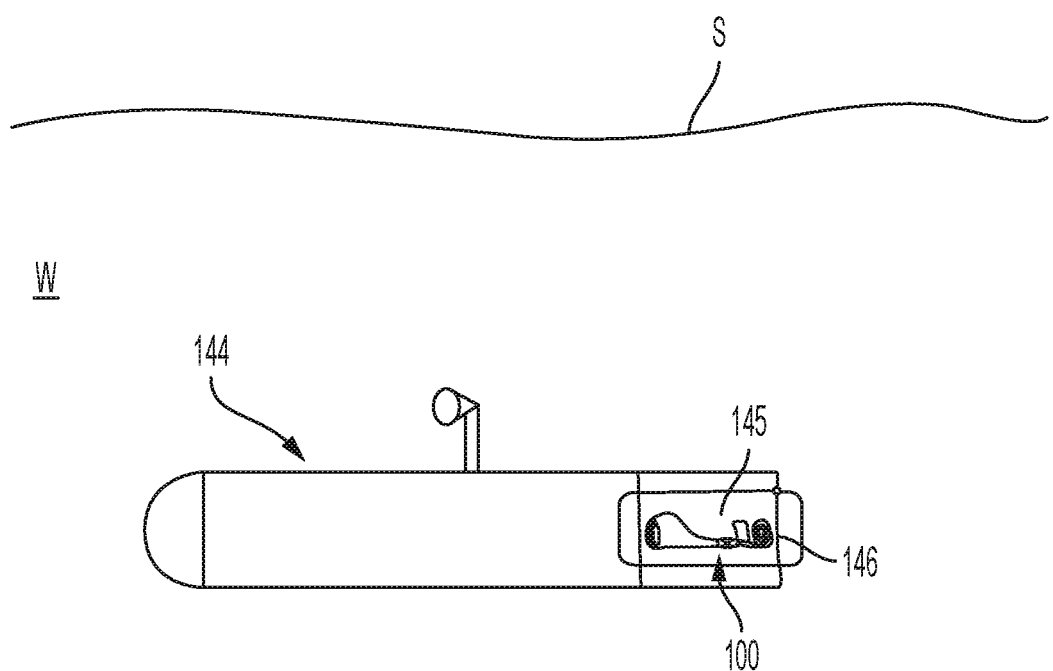
FIG. 2A is a schematic representation of the system of FIG. 1A, shown carried in a compartment of an underwater craft at a first time prior to release of the system from the underwater craft.
Figure 2B:
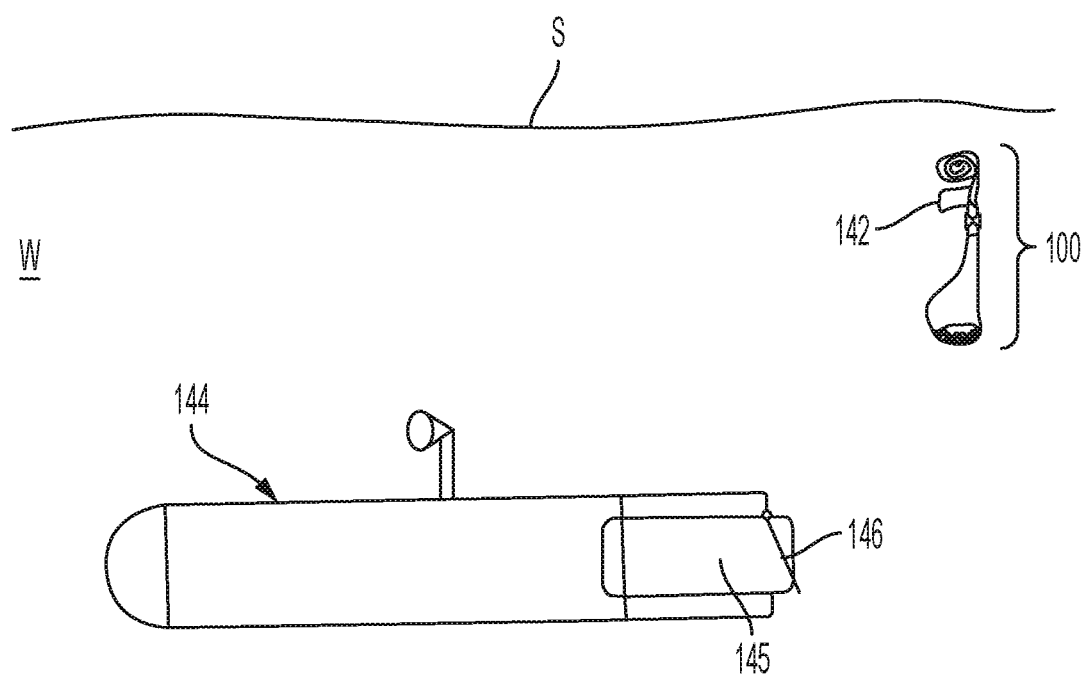
FIG. 2B is a schematic representation of the system of FIG. 1A, shown at a second time following release of the system from the compartment of the underwater craft as buoyancy of lifting gas in the balloon carry the system toward a surface of a body of water.
Figure 2C:
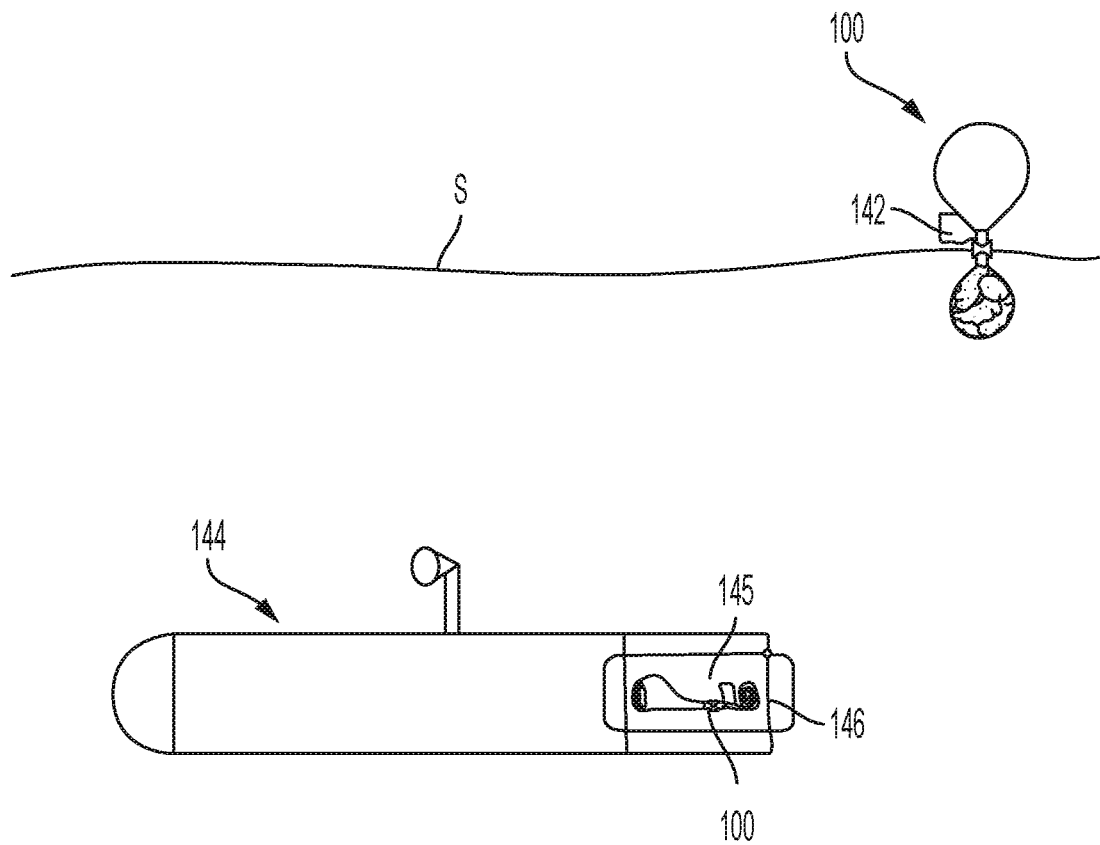
FIG. 2C is a schematic representation of the system of the system of FIG. 1A, shown at a third time following release of the system with the system shown raised to the surface of the body of water by the lifting gas in the balloon.
Figure 3:
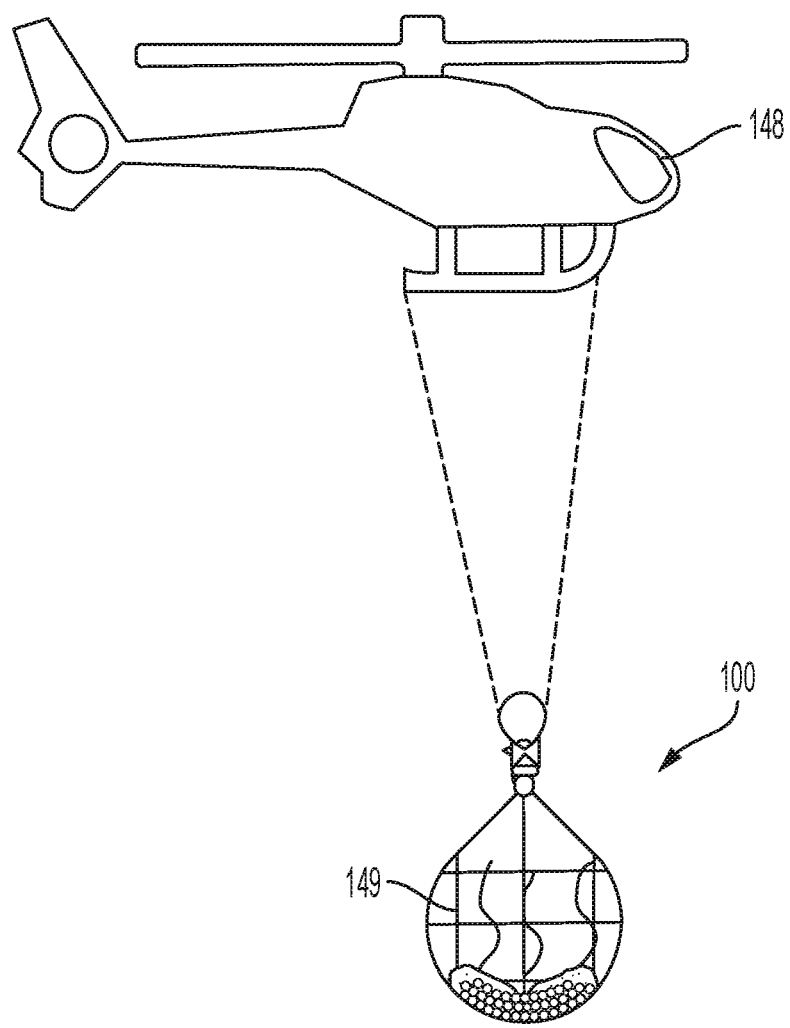
FIG. 3 is a schematic representation of the system of FIG. 1A carried by an aircraft for midair deployment of the balloon.
Figure 4A:
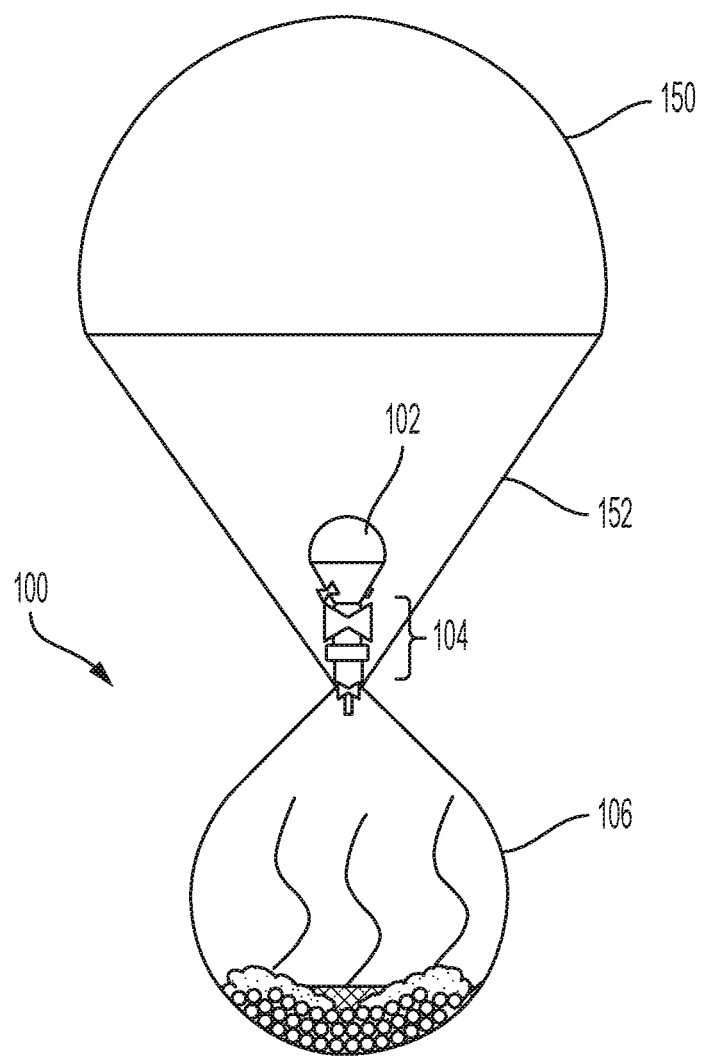
FIG. 4A is a schematic representation of the system of FIG. 1A deploying a balloon in mid-air, the system including a reactor, a balloon, and a parachute coupled to one another, with the system shown at a first time with the reactants reacted in a chamber of the reactor prior to actuation of a control valve to allow the lifting gas in the chamber to flow into the balloon.
Figure 4B:
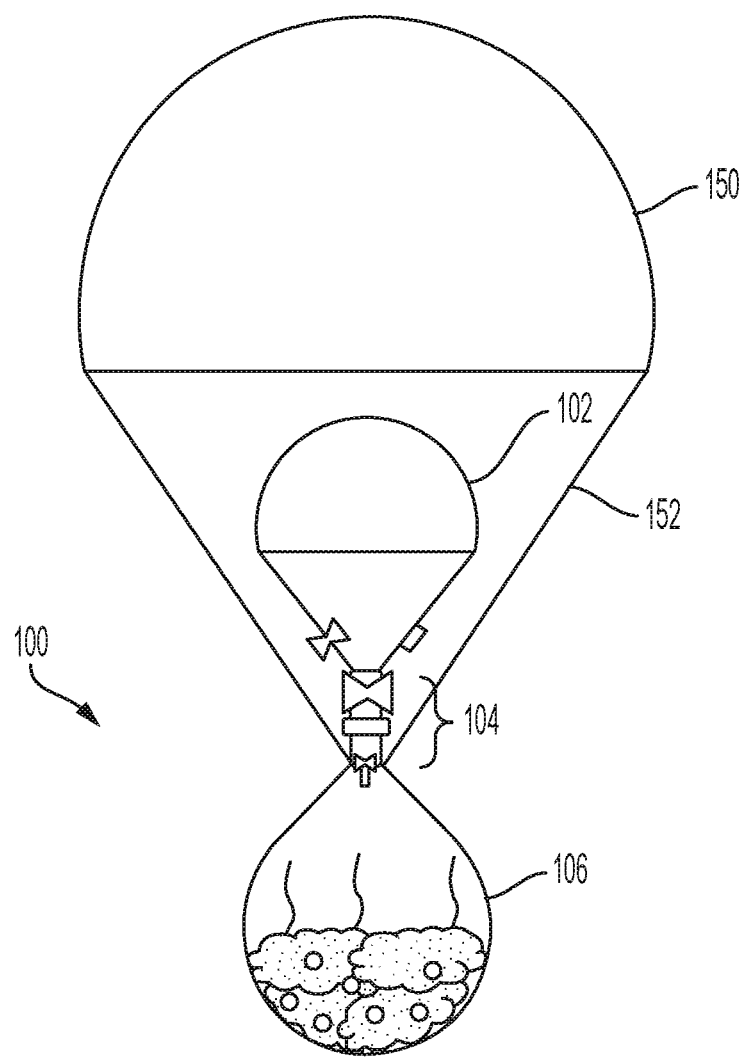
FIG. 4B is a schematic representation of the system of FIG. 1A, with the system shown at a second time with the control valve actuated to allow the lifting gas to flow from the chamber of the reactor into the balloon, with the balloon shown partially filled.
Figure 4C:
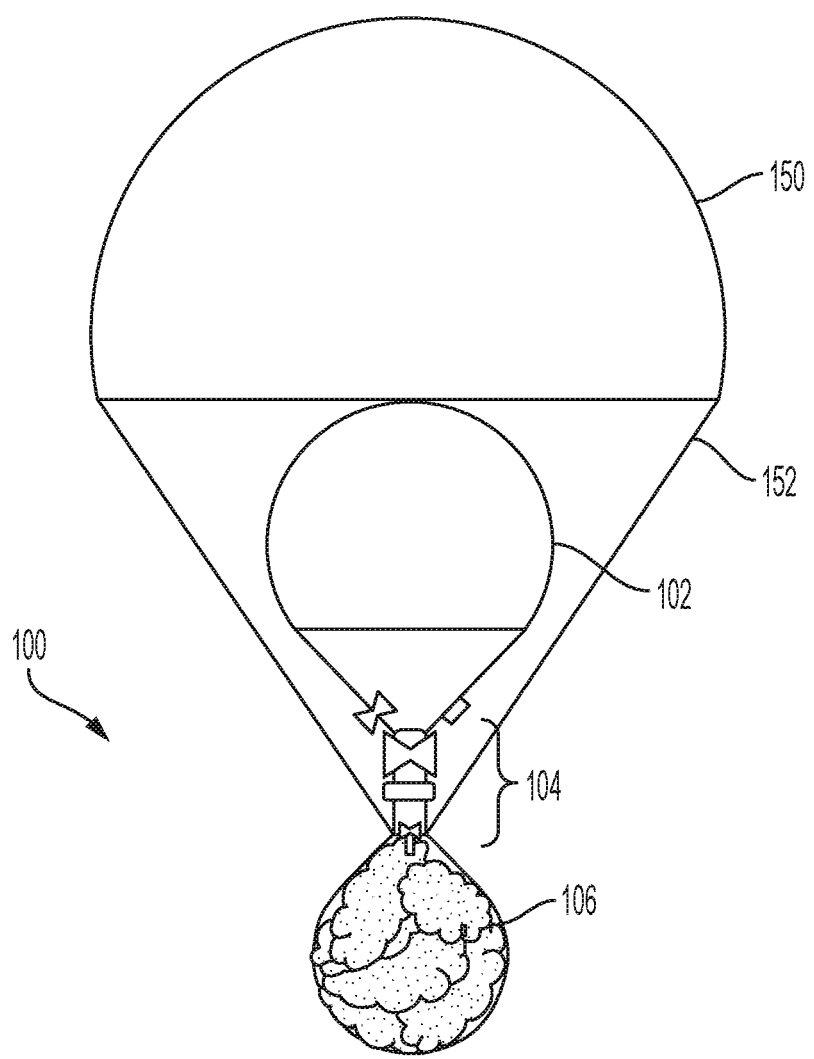
FIG. 4C is a schematic representation of the system of FIG. 1A, with the system shown at a third time with the control valve actuated to allow the lifting gas to flow from the chamber of the reactor into the balloon, with the balloon shown fully filled.
Figure 5:
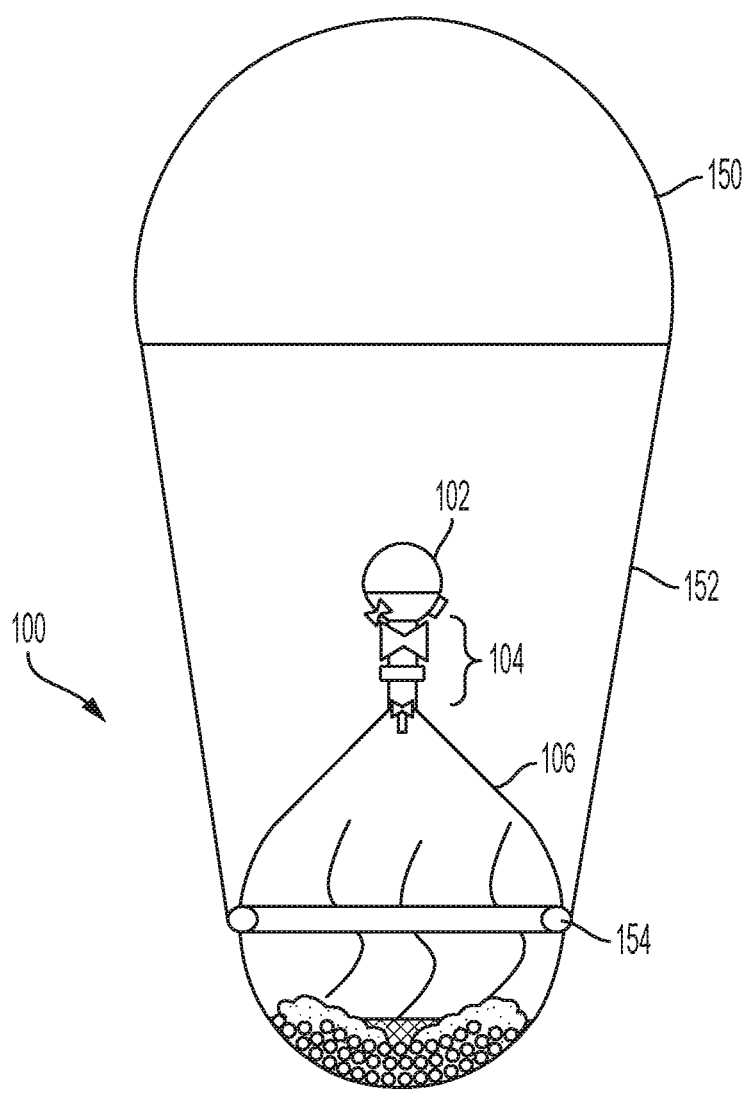
FIG. 5 is a schematic representation of the system of FIG. 1A deploying a balloon in mid-air, the system shown at a first time with the reactants reacted in a chamber of the reactor prior to actuation of a control valve to allow the gas to flow from the chamber into the balloon.

The underwater vehicle 144 may define an enclosure 145 for initiating a hydrogen producing reaction in the system 100 and/or launching the system 100. As an example, the enclosure 145 may be nominally kept flooded and when it is time to deploy the system 100, a door 146 along the enclosure 145 may be opened to eject the system 100 into the body of water W. In some instances, the reaction of the fuel 114 in the chamber 110 may be started in the enclosure 145, just prior to ejection of the system 100. As shown in FIG. 2B, the underwater vehicle 144 may carry multiple instances of the system 100, such as may be useful for prolonged underwater excursions. Thus, after a first instance of the system 100 is ejected from the enclosure 145, another instance of the system 100 may be moved into the enclosure 145 for subsequent deployment (e.g., when the underwater vehicle 144 has moved to a different location, has gathered additional information, etc.).

In certain implementations, at least the balloon 102 of the system 100 may remain coupled to the underwater vehicle 144 such that hydrogen containing gas in the balloon 102 may provide buoyancy to the underwater vehicle 144. The amount of buoyancy may vary according to the particular mission and, thus, may be used for such things as position stabilization at a specific depth and/or surfacing.

In certain implementations, the reactants in the chamber 110 of the reactor 106 may include any one or more of various different additives useful for promoting a hydrogen-producing reaction between water from the body of water W and the fuel 114. Examples of additives useful for promoting hydrogen production from reaction of the fuel 114 in the presence of salt-water are described in U.S. patent application Ser. No. 17/351,079, filed on Jun. 17, 2021, and entitled "CONTROLLING REACTABILITY OF WATER-REAC-TIVE ALUMINUM," the entire contents of which are incorporated herein by reference.

With the system 100 submerged in the body of water W, thermal communication between the body of water W and the chamber 110 may help to cool and condense steam in the chamber 110. Based on one or more parameters (e.g., temperature and pressure) sensed in the chamber 110, the control valve 112 may be actuated to open so mostly hydrogen gas flows into and expands the envelope 108 of the balloon 40. This is enabled by the pressure difference initially and later by the chamber 110 being stiffer than the envelope 108. Once the balloon 102 has reached a desired state of inflation, such as can be determined by a pressure sensor, and or calibration, the control valve 112 may be closed, the connector 125 may be activated to release the reactor 106 from the balloon 102 such that the balloon 102 may float from the water surface S upwards into the atmosphere with the payload 142 or for example stored data and communications equipment to transmit the data.

Having described certain use cases associated with deploying the system 100 underwater, attention is now directed to deploying the system 100 from an aircraft. For the sake of clear and efficient explanation, the aircraft is described as being a helicopter. However, unless otherwise indicated or made clear from the context, it shall be understood that the aircraft may additionally or alternatively include fixed wing aircraft, aerostats, etc.

Referring now to FIGS. 1A-1D and FIG. 3, the system 100 may be carried to altitude by an aircraft 148. For example, in instances in which the aircraft 148 is a helicopter, the system 100 may be inflated underneath the helicopter or raised up by the helicopter and then disconnected once hydrogen-containing gas begins to be formed by the system 100. As a specific example, the reaction of the fuel 114 in the system 100 may proceed while the system 100 is hung from the aircraft 148. At least a portion of the system 100 may be decoupled from the aircraft 148 once the system 100 has become buoyant in the air or the reaction has nearly completed and the balloon 102 is ready to jettison the reactor 106. A cinch 149 (e.g., a retractable net) may be placed around a circumference of the chamber 110, so that once the reaction in the chamber 110 is complete, the cinch 149 can retract and squeeze the hydrogen-containing gas 116 from the chamber 110 of the reactor 106. As an example, the cinch 149 may be driven by a torsional spring, such as a large constant torsion spring. A trigger may be actuated to reel the torsional spring in a manner analogous to retraction of a measuring tape into a tape measure.

Having described deployment of the system 100 below an aircraft, attention is now directed to deployment of the system 100 in mid-air, such as in use cases in which the system 100 is ejected from an aircraft.

Referring now to FIGS. 1A-1D and FIGS. 4A-4C, the system 100 may further include a parachute 150 coupled to one or more of the reactor 106 or the valve assembly 104. Further, or instead, one or more cords 152 of the parachute 150 may be coupled about the reactor 106 such that tension in the one or more cords 152 may squeeze the hydrogen-containing gas 116 from the chamber 110. In certain implementations, the reaction of the fuel 114 in the chamber 110 may be started just before the system 100 is ejected from an aircraft. That is, water may be added to the system 100 while the system 100 is still onboard the aircraft. Starting the prior to ejection may be useful for allowing the balloon 102 to be filled with the hydrogen-containing gas 116 before the system 100 reaches the ground.

The parachute 150 may be, for example, a split parachute (two or three chutes). When it is time for the balloon 102 to be released, the balloon 102 may float up through the gap between parachutes, or a single chute's cords. The parachute 150 may be deployed before the reaction container becomes too big and buffeted by high falling velocities. As the system 100 is falling, the rapid airflow past it may create good cooling of the chamber 110 to facilitate condensing steam. Further, or instead, airflow pushing on the bottom of the chamber 110 of the reactor 106 may facilitate pushing the hydrogen-containing gas 116 from the chamber 110 into the envelope 108 of the balloon 102.

Having described implementations of the system 100 in which differences in stiffness between the chamber 110 and the envelope 108 are attributable to material and/or physical properties of respective substrates of material, attention is now directed to various different implementations in which the difference in stiffness between the chamber 110 and the envelope 108 is at least partially attributable to the addition of additional features.

Referring now to FIGS. 1A-1D and FIG. 5, the system 100 may further, or instead, include a reinforcement 154 disposed along at least a portion of the second substrate 122 along the chamber 110. The reinforcement 154 may include at least one reinforcement material that is less elastic than the second substrate. As an example, the reinforcement 154 may extend at least circumferentially about the chamber 110. Examples of the reinforcement 154 include a basket, an annulus, or a combination thereof. Wicker may be a particularly useful material for the reinforcement, given that it is strong, lightweight, and has low elasticity. Further, or instead, wicker may be useful as an ignitable material in instances in which it may be desirable to ignite the reactor 106 just before or just after decoupling the reactor 106 from the balloon 102. More generally, at standard temperature and pressure, the at least one reinforcement material may have a lower ignition temperature than the second substrate 122.

In implementations in which the reinforcement 154 extends circumferentially about the chamber 110, one or more of the cords 152 of the parachute may be coupled to the reinforcement 154. Further, or instead, the reinforcement 154 may be tightened about the chamber 110 via tension applied to the reinforcement 154 by the cords 152 in tension as the parachute 150 produces drag.

Figure 6:
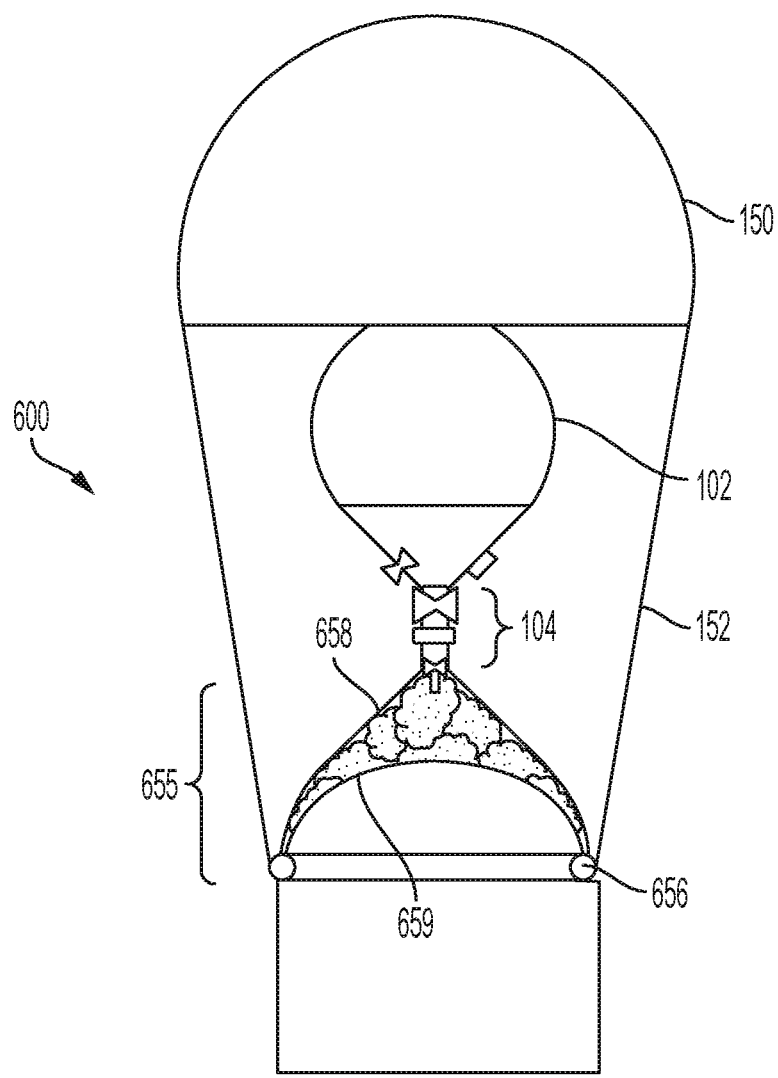
FIG. 6 is a schematic representation of a system for deployment of an inflatable structure, the system including a balloon and a torus with a flexible section.
Figure 7:
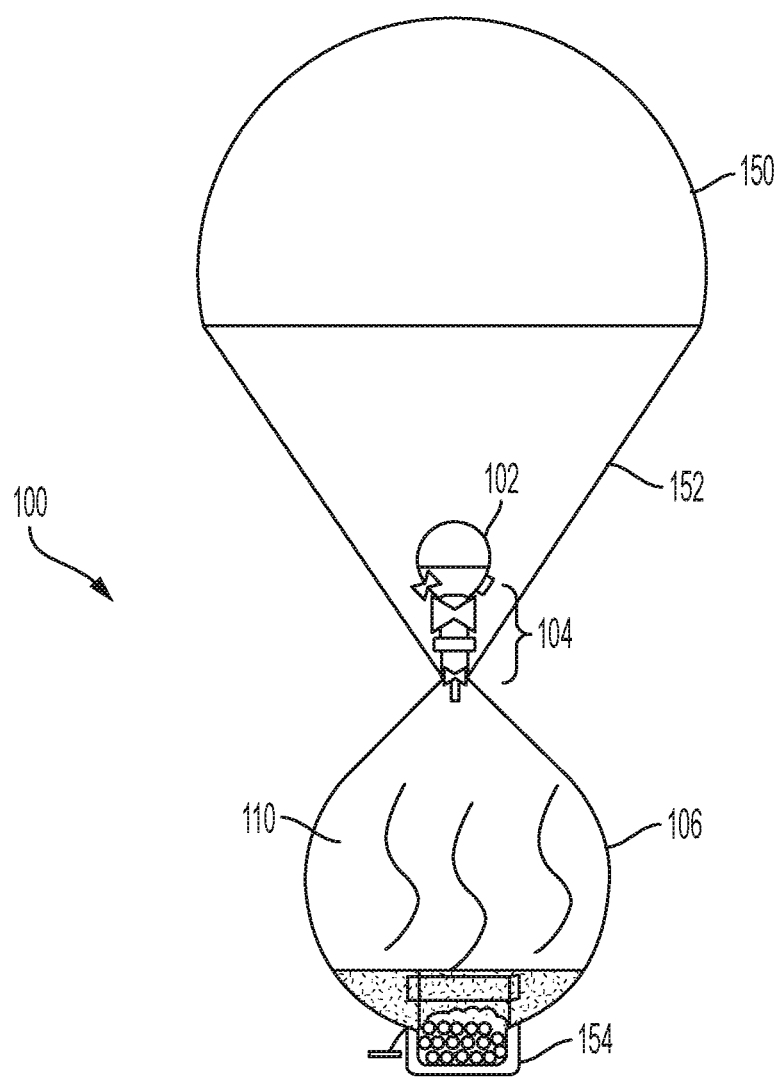
FIG. 7 is a schematic representation of the system of FIG. 1A including a reinforcement along the reactor.
Figure 8:
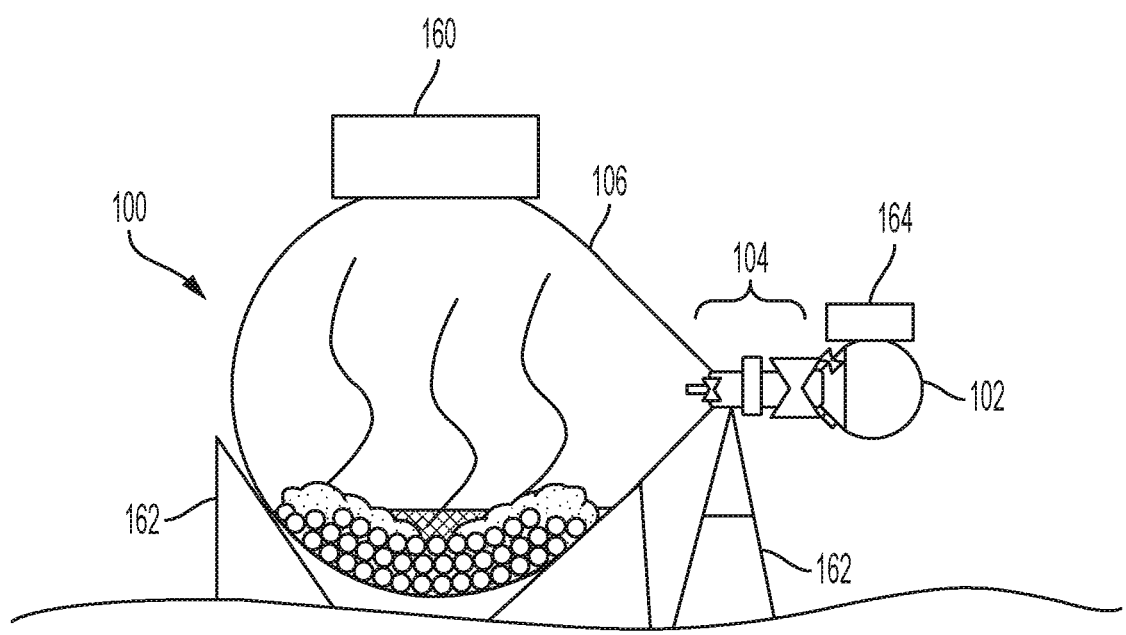
FIG. 8 is a schematic representation of the system of FIG. 1A deploying the balloon from the ground with a weight along the reactor.
Figure 9:
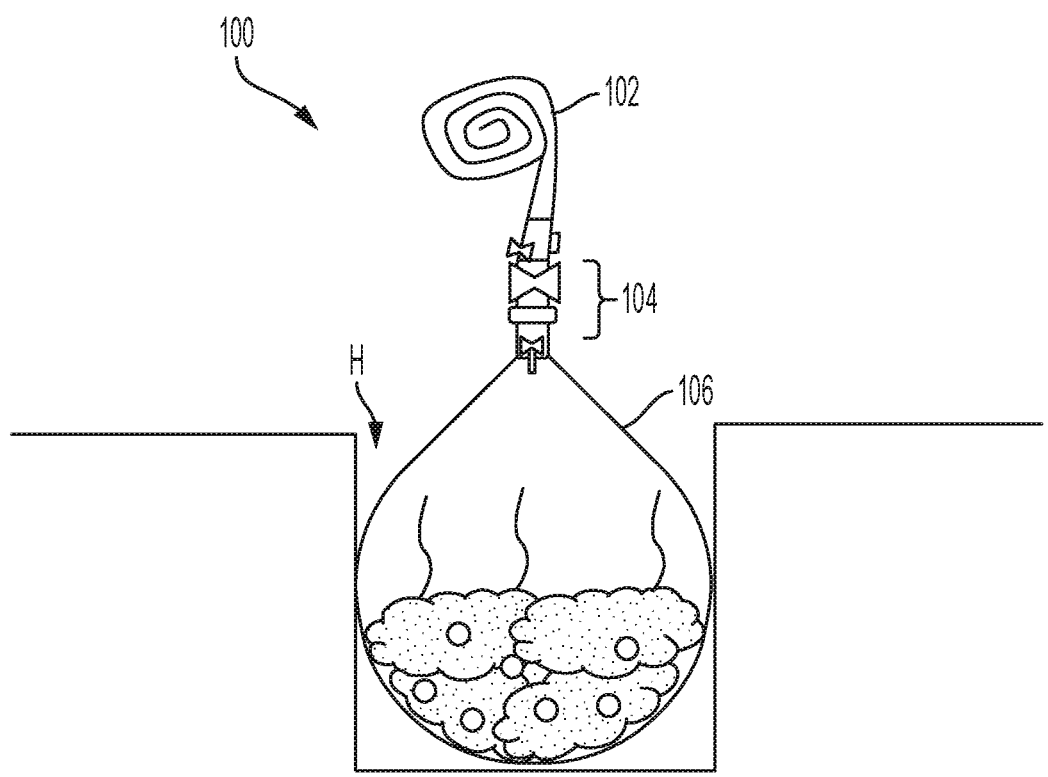
FIG. 9 is a schematic representation of the system of FIG. 1A deploying the balloon from a hole dug in the ground.

Referring now to FIG. 6, a system 600 may be analogous to the system 100, unless otherwise specified or made clear from the context. The system 600 may include a reinforcement 655 may include a ring 656, a flexible top 658, and a flexible bottom 660. The ring 156 may be inflatable to form an effectively rigid hoop (a torus), to which the flexible top 158 and the flexible bottom 659 may be attached. The flexible top 658 and the flexible bottom 660 may define a chamber therebetween such that any one or more of various different techniques described herein for producing hydrogen-containing gas may be carried out using the system 600, unless otherwise specified or made clear from the context. Alternatively, a spherical flexible structure may have at its equator attached an inflatable torus to give some circumferential rigidity. Around the torus' circumference are attached parachute cords to an above deployed parachute. At the top of the structure is a valve that connects it to a balloon to be filled with hydrogen gas. Water and fuel will hang down in the lower structure as it falls and as the reaction progresses and the structure inflates the water, aluminum, and reaction byproducts will settle in the bottom. When the reaction is complete and the steam has condensed, the valve can be opened and the hydrogen will be forced into the balloon as air pressure pushes the lower structure with its gas contents up.

Referring now to FIGS. 1A-1D and FIG. 7, in some implementations, the reinforcement 154 may include a reinforced portion of the reactor 106 along the balloon 102. For example, the reinforcement 154 may be along an end portion of the chamber 110 opposite the valve assembly 104, where the chamber 110 is lowest when the system 100 is deployed. In instances in which the amount of reinforcement varies about the chamber 110, the reinforcement material may be disposed along the second substrate 122 with a maximum volumetric concentration of the reinforcement material along an end portion of the chamber 110 opposite the valve assembly 104. Further, or instead, the reinforcement 154 may include a plurality of fibers of the at least one reinforcement material, and the plurality of fibers may be at least partially embedded along at least a section of the second substrate 122.

Referring now to FIGS. 1A-1D and FIG. 8, the system 100 may be deployed on the ground. For example, a first weight 160 (e.g. a weighted bag such as those used by ballooners to weigh down balloons before flight) may be positioned on the reactor 206 to increase the effective stiffness of the reactor 206 relative to stiffness of the balloon 102. A second weight 164, such as a second bag, may be lighter than the first weight 160, such that gas will still flow from the reactor 106 to the balloon 102.

Referring now to FIGS. 1A-1D and FIG. 9, the system 100 may be deployed from a hole H dug in the ground such that the ground surrounding the reactor 106 provides stiffness useful for moving the hydrogen-containing gas into the balloon 102.

Referring now to FIGS. 10A-10C, a system 1000 may include a balloon 1002 and a reactor 1006. For the sake of clear and efficient description, elements of the system 1000 should be understood to be analogous to or interchangeable with elements of the system 100 corresponding to 100-series element numbers (e.g., in FIGS. 1A-1D) described herein, unless otherwise explicitly made clear from the context and, therefore, are not described separately from counterpart 100-series element numbers, except to note differences and/or to emphasize certain features. Thus, for example, the balloon 1002 of the system 1000 shall be understood to be identical the balloon 102 (FIGS. 1A-1D), except to any extent indicated.

In general, the balloon 1002 and the reactor 1006 may be a monolith at least along a connector 1125 of a valve assembly 1004. The connector 1125 may be operable to split the monolith along the connector 1125 to release a first portion 1131 of the connector 1125 from a second portion 1132 of the connector 1125. For example, an actuator 1134 of the valve assembly 1004 may be a wire operable to split the monolith through heat directed to the monolith of the connector 1125 via the actuator 1134. Further, or instead, the actuator 1134 may be a spring-loaded blade movable to split the monolith of the connector 1125 through movement of the spring-loaded blade through the monolith.

In certain instances, the system 1000 may include a necked region 1172 between the balloon 1002 and the reactor 1006. The system 1000 may, for example, include a clamp 1170 disposed along the necked region 1172. A controller 1126 may be in electrical communication with the clamp 1170. Non-transitory computer-readable media 1130 of the controller 1126 may have stored thereon instructions for causing a processing unit 1128 to send an actuation signal to the clamp 1170 to restrict fluid communication between a chamber 1110 of the reactor 1006 and an envelope 1008 of the balloon 1002.

As shown in FIG. 10A, water may be introduced to fuel 1114 in the reactor 1006 from a water source 1180 coupled in fluid communication with the chamber 1110 of the reactor 1006.

As shown in FIG. 10B, as the valve assembly 1004 is actuated to allow hydrogen-containing gas into the balloon 1002, the balloon 1002 may inflate to a large size.

As shown in FIG. 10C, as steam in the balloon 1002 condenses, the size of the balloon 1002 in the inflated state may decrease.

Figure 10D:
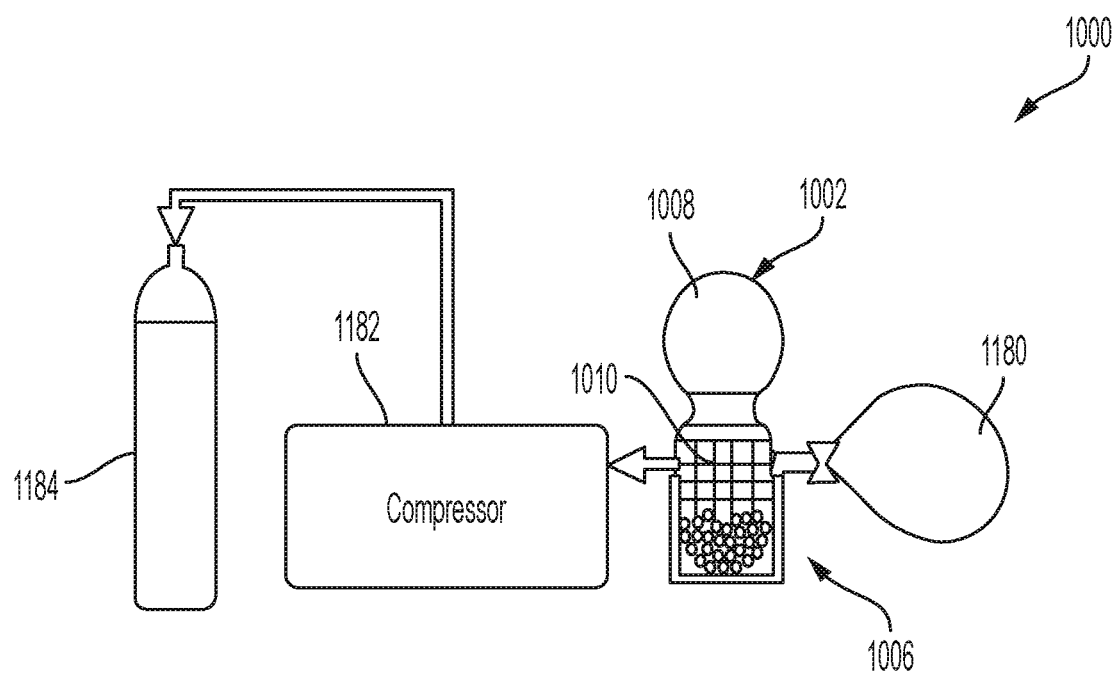
FIG. 10D is a schematic representation of the system of FIG. 9A coupled to a pump.

Referring now to FIG. 10D, in some implementations, the system 1000 may be coupled to a compressor 1182 (e.g., a pump). Once hydrogen-containing gas in the reactor 1106 cools, a portion of the hydrogen-containing gas in the reactor 1106 may be directed to the balloon 1002 and/or to the compressor 1182 in fluid communication with the reactor 1106. The compressor 1182 may compress the hydrogen-containing gas into a high-pressure container 1184 for later use.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A method of deploying an inflatable structure, the method comprising:
   forming a hydrogen-containing gas in a chamber defined by a flexible reactor coupled to a balloon defining an envelope;
   flowing the hydrogen-containing gas from the chamber of the flexible reactor into the envelope of the balloon in response to a difference in stiffness between the chamber and the envelope;
   sealing the hydrogen-containing gas in the envelope of the balloon; and
   disconnecting the flexible reactor from the balloon with the hydrogen-containing gas sealed therein.

2. The method of claim 1, wherein forming the hydrogen-containing gas in the chamber of the flexible reactor includes unfolding the chamber of the flexible reactor from an initial folded configuration as the hydrogen-containing gas is formed in the chamber.

3. The method of claim 1, wherein forming the hydrogen-containing gas in the chamber of the flexible reactor includes submerging at least a portion of the flexible reactor in a body of water.

4. The method of claim 1, wherein forming the hydrogen-containing gas in the chamber of the flexible reactor includes cooling the flexible reactor in a fluid.

5. The method of claim 1, wherein forming the hydrogen-containing gas in the chamber includes condensing water from the hydrogen-containing gas in the chamber, and the hydrogen-containing gas flows from the chamber into the envelope after moisture is condensed from the hydrogen-containing gas in the chamber.

6. The method of claim 1, wherein sealing the hydrogen-containing gas in the envelope of the balloon includes closing a check valve between the chamber of the flexible reactor and the envelope of the balloon.

7. The method of claim 6, wherein the check valve closes in response to a pressure difference between the chamber of the flexible reactor and the envelope of the balloon.

8. The method of claim 7, wherein the check valve closes in response to the pressure difference.

9. The method of claim 1, wherein disconnecting the flexible reactor from the balloon includes electrically actuating an actuator to disconnect a connector coupled between the balloon and the flexible reactor.

10. The method of claim 1, wherein disconnecting the flexible reactor from the balloon is based on one or more feedback signals indicative of pressure in the chamber of the flexible reactor, pressure in the envelope of the balloon, pressure in an environment outside of the balloon, temperature in the chamber of the flexible reactor, altitude of the balloon, or a combination thereof.

11. The method of claim 1, wherein the hydrogen-containing gas flows from the chamber into the envelope along a monolith, and disconnecting the flexible reactor from the balloon includes splitting the monolith.

12. The method of claim 1, further comprising placing one or more reinforcement materials along the chamber of the flexible reactor.

13. The method of claim 12, wherein the one or more reinforcement materials is placed along an outer surface of the flexible reactor.

14. The method of claim 13, wherein placing the one or more reinforcement materials along the chamber includes positioning the chamber of the flexible reactor in a hole in earth with the envelope of the balloon expandable outside of the hole.

15. The method of claim 1, further comprising draining water from the envelope of the balloon.

16. A method of deploying an inflatable structure, the method comprising:
   forming a hydrogen-containing gas in a chamber defined by a reactor coupled to a balloon defining an envelope;
   squeezing the chamber of the reactor, with force of squeezing the chamber moving the hydrogen-containing gas from the chamber into the envelope of the balloon; and
   sealing the hydrogen-containing gas in the envelope of the balloon.

17. The method of claim 16, wherein squeezing the chamber of the reactor includes tensioning a cinch about a circumference of the reactor.

18. The method of claim 16, wherein squeezing the chamber of the reactor includes placing a weight on top of the reactor.

19. A method of deploying an inflatable structure, the method comprising:
   forming a hydrogen-containing gas and reaction by-products in a chamber defined by a reactor coupled to a balloon defining an envelope;
   flowing the hydrogen-containing gas from the chamber of the reactor into the envelope of the balloon in response to a difference in stiffness between the chamber and the envelope;
   sealing the hydrogen-containing gas in the envelope of the balloon; and
   jettisoning the reaction by-products from the reactor.

20. The method of claim 19, wherein jettisoning the reaction by-products includes rupturing the reactor.

* * * * *